Jan. 20, 1959  J. V. OLIVEAU  2,870,284
EXPLOSION-PROOF FLOAT SWITCH FOR FUEL SUPPLY TANKS FOR AIRCRAFT
Filed Oct. 31, 1956  3 Sheets-Sheet 1

INVENTOR.
JOHN V. OLIVEAU
BY Benj. T. Rauber
ATTORNEY

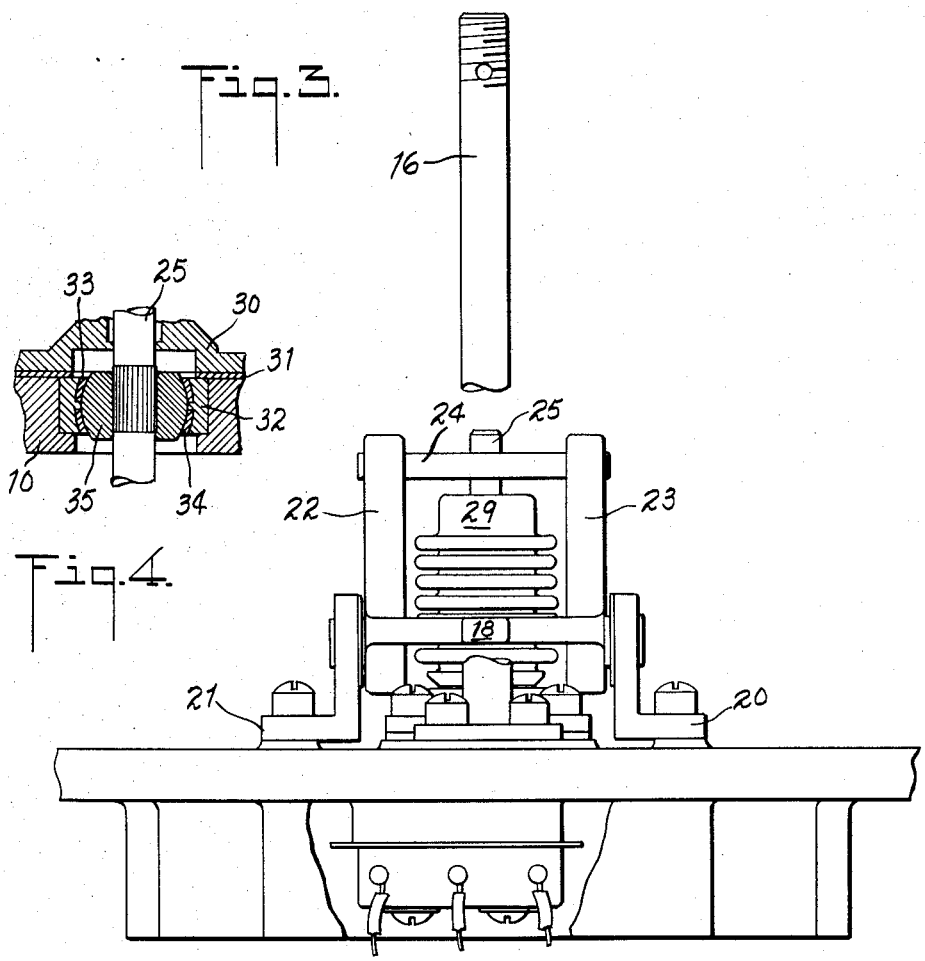
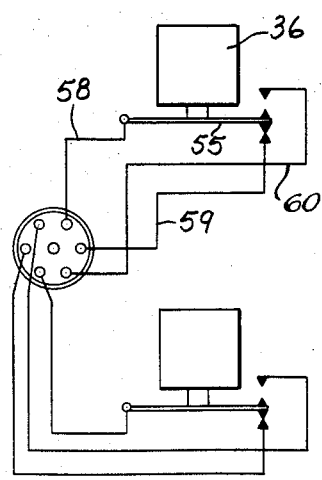

Jan. 20, 1959  J. V. OLIVEAU  2,870,284
EXPLOSION-PROOF FLOAT SWITCH FOR FUEL SUPPLY TANKS FOR AIRCRAFT
Filed Oct. 31, 1956  3 Sheets-Sheet 3
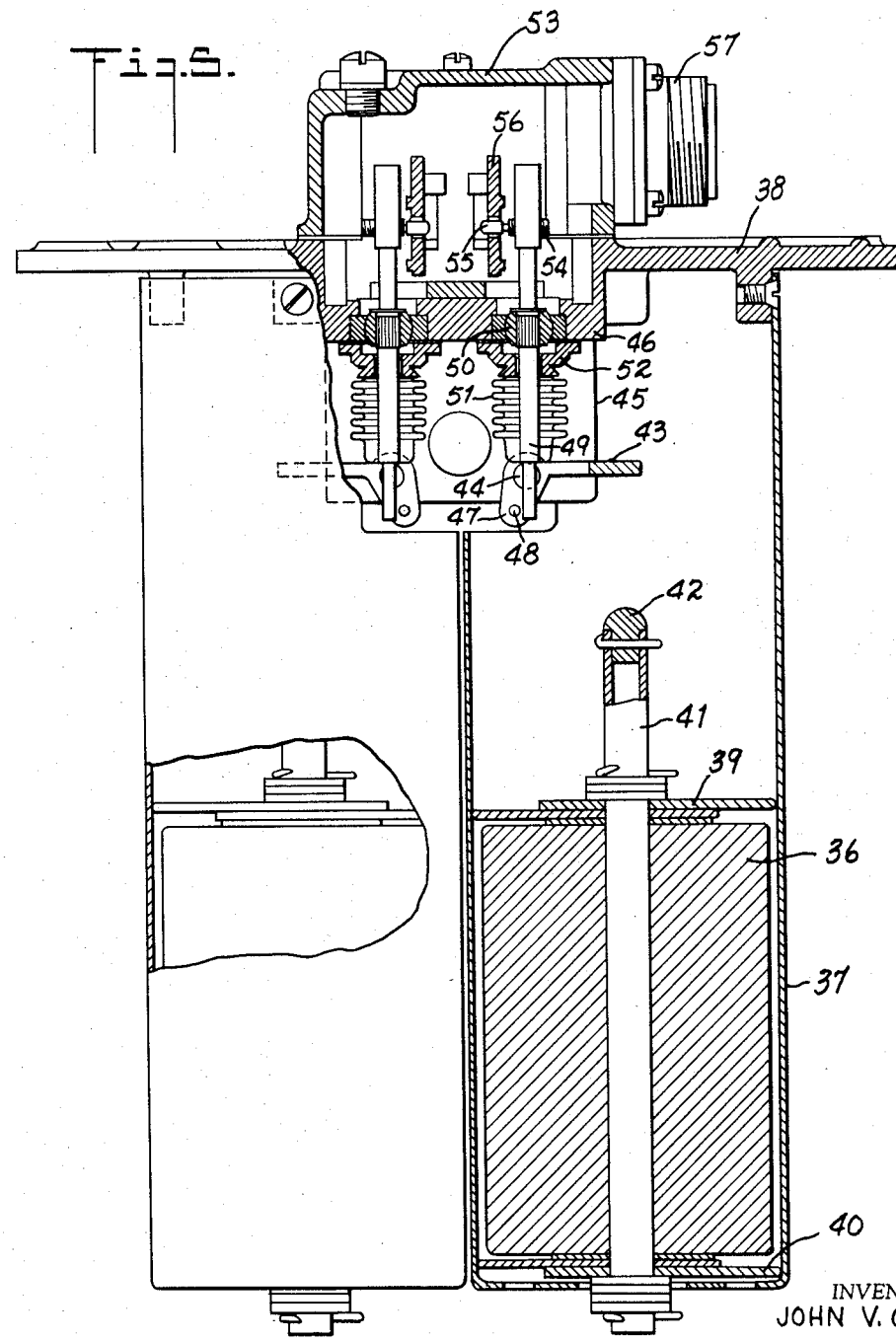
INVENTOR.
JOHN V. OLIVEAU
BY
*Benj. T. Rauber*
ATTORNEY United States Patent Office 2,870,284
Patented Jan. 20, 1959

2,870,284

EXPLOSION-PROOF FLOAT SWITCH FOR FUEL SUPPLY TANKS FOR AIRCRAFT

John V. Oliveau, Greenwich, Conn., assignor to The Aerotec Corporation, Greenwich, Conn., a corporation of Connecticut Application October 31, 1956, Serial No. 619,472

7 Claims. (Cl. 200—84)

My present invention relates to an explosion-proof float switch particularly for fuel supply tanks for aircraft.

This application is a continuation-in-part of my copending application Ser. No. 535,809 filed September 22, 1955, now abandoned.

Float switches are used on the fuel tanks of aircraft to indicate through an electric warning circuit when the tank is nearly empty and must be replaced by a new source of supply. As the empty tank may be discarded in flight, it is desirable to provide equipment, such as float switches, at the lowest cost and of the simplest construction consistent with safety.

As the tanks are sealed against the free flow of air into and out of the tank and may be under a small pressure, it is necessary to seal the tanks against leakage under all conditions and to prevent flame from entering the tank and causing an explosion.

My invention provides a float switch of simple construction that is effectively sealed against leakage into or out of the tank and that is protected against the entry of flame should any part of the sealing elements fail.

In the float valve of my invention a switch control lever is pivoted in a wall of the tank in a ball and socket joint in which the socket has a spherical bearing surface truncated by a pair of parallel planes symmetrical with the center of the spherical surface. The lever extends through the socket and is mounted in a ball fitting the socket with a narrow tolerance so that it is securely mounted against displacement in either direction. The clearance between the ball and socket is sufficiently small to quench any flame or explosion from passing through the joint.

To further insure against the escape of fuel vapors and the passage of flame, the lever is hermetically sealed to the wall of the tank or to the socket mounting by means of a flexible bellows having a closed end through which the lever extends and to which it is sealed air and fluid tightly and having the opposite end sealed fluid tightly to the wall of the tank or to the socket housing. This bellows insures against the possibility of the passage of fuel vapors or of flame. Should the bellows develop a defect or crack because of flexing or of extreme temperature changes, the close fitting metal surfaces of the ball and socket would quench any flame or explosion from entering the fuel tank.

Repeated flexing of the bellows under the conditions of flight has a tendency to harden or make brittle the metal of the bellows and this tendency is the greater the greater the flexing. To reduce this flexing to a minimum the movement of the float controlled lever is reduced to a minimum without restricting the movement of the float itself. To this end the float may move independently of the lever throughout a large part of its travel and contact and operate the lever only in that small part of its movement when the switch is to be operated.

The various features of my invention are illustrated, by way of example, in the accompanying drawings in which Fig. 1 is a vertical section of a float switch embodying the invention;

Fig. 3 is a vertical section of the part shown in Fig. 2 taken at a right angle to the section of Fig. 1;

Fig. 4 is a section of the ball and socket joint taken transverse to the lever arm;

Fig. 5 is a vertical section of another embodiment of the invention;;

Fig. 6 is a wiring diagram for the embodiment of Fig. 5.

Figure 1:
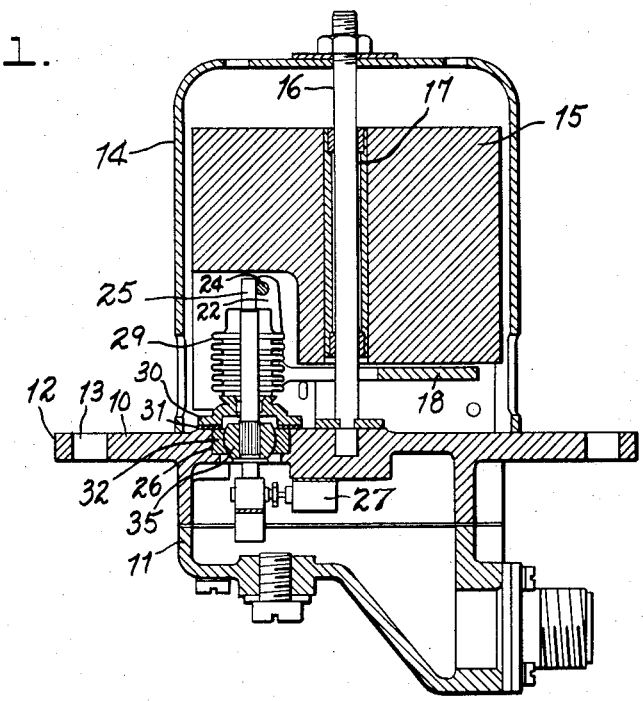

In Fig. 1 the invention is embodied in a float controlled valve to be mounted in the bottom of the fuel tank. For this purpose an upper wall 10 of a switch housing 11 extends outwardly to form a flange 12 having holes 13 through which may extend bolts or rivets to secure the switch to the bottom of the tank. Extending upwardly from the wall 10 is a float chamber 14 in which a float 15 may move vertically as the level of fuel in the tank rises and falls. The float is guided in its vertical movement by a vertical guide rod 16 extending through a vertical guide passage 17. The float may move freely within its chamber.

Figure 2:
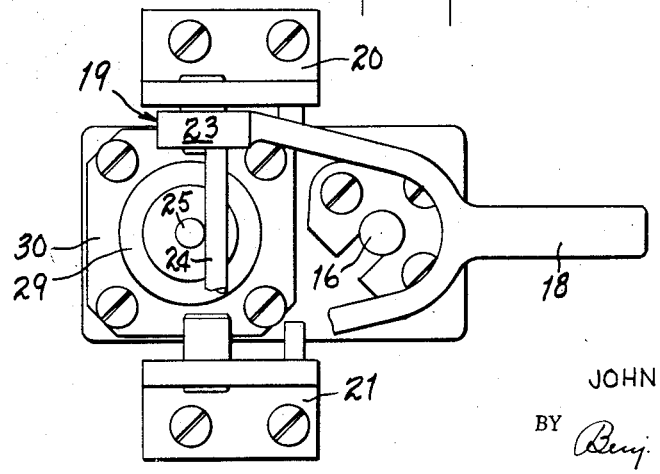
Fig. 2 is a plan view of the embodiment of Fig. 1, the float being removed.

When the fuel level falls the float 15 comes to rest on the horizontal forked arm 18 of a bell crank transmission lever 19, Figs. 1, 2 and 3, pivoted in a pair of bearing brackets 20 and 21. The bell crank lever has a pair of spaced upward arms 22 and 23 joined near their upper ends by a cross bar 24. The cross bar bears against an upwardly extending switch lever 25 pivoted in a ball and socket bearing 26 mounted gas tight in the wall 10. The lower end of the lever 25 is counterweighted and bears against a microswitch 27 mounted in the under surface of the wall 10 within the switch housing 11. When the float is in its upper position, free from the lever arm 18, the lever 19 and cross bar 24 are spring pressed counterclockwise against the switch lever 25 swinging this lever to actuate the microswitch to indicate a tank full condition by either closing or opening the switch in accordance with the wiring and signaling system. When the float drops to rest on, and depress, the lever arm 18, the lever arms 22 and 23 and cross bar 24 swing clockwise releasing the switch lever 25 so that it may be tilted by its counterweight to release the microswitch. The float 15 thus actuates the bell crank transmission lever 19 only in the lowest part of its movement and the tilting of the switch lever 25 is limited to the minimum angle required for the operation of the microswitch. To reduce to a minimum the movement of the switch lever an adjustable contact screw 28 is provided on the switch lever 25 so that by screwing it toward or from the microswitch it may at all times be in contact with this switch and lost motion be eliminated.

To provide an hermetic seal against leakage of fuel from the tank into the switch housing where a spark from the operation might cause an explosion or fire, the ball and socket bearing is sealed from the tank by a cylindrical bellows 29 encircling the part of the switch lever 25 near the bearing. The bellows 29 is closed at its upper end except for an opening just sufficient for the lever 25 and is sealed by solder, or otherwise, to the arm. The lower, open, end of the bellows is sealed by crimping or rolling and soldering it to a cover plate 30 which is sealed and secured to the wall by a gasket 31 and securing screws. This prevents any leakage of fuel into the switch housing.

In the event of a rupture of the bellows 29 and possible leakage of fuel into the switch chamber and ignition of this fuel, the ball and socket bearing is so constructed that flame cannot pass through the bearing into the tank. The clearance between the ball and socket is, for this purpose, so small that flame would be chilled between the closely adjacent surfaces of the socket and ball and thus quenched before it could pass through the bearing. This construction is shown in Fig. 4. As shown in Fig. 4 the socket comprises a ring 32 received in a circular opening in the wall 10 to rest on an annular flange and is sealed at its upper face by the gasket 31. The inner periphery of the ring 32 is provided with a pair of complementary liners 33 and 34 of bearing metal on opposite sides of the median plane of the ring to form a bearing surface of truncated spherical curvature. A ball 35 through which passes the switch bar 25 is enclosed by the liners which are pressed toward each other to bring the inner surfaces of the liners and the outer surface of the ball into very close contact. Even though liquid might work through this bearing if the bellows 29 should fail, no flame or explosion could pass through the bearing because of the cooling effect of the contacting surfaces of the socket and ball of the bearing.

Another embodiment of the invention mountable in the top wall of the tank to indicate when it is filled, is shown in Fig. 5. In this embodiment two float switches and floats are provided one being a "primary float" and switch and the other being a secondary float and switch. As their construction is substantially the same only the "primary float" and switch need be described.

In this embodiment each float 36 is mounted in a float chamber 37 open at its lower end for the passage of liquid and secured at its upper end to the underside of a mounting plate 38 which may be mounted on the top wall of the tank. The float is guided in its vertical movements by a pair of triangular plates 39 at its upper end and a similar pair of triangular plates 40 at its lower end. The apices of these plates have a sliding contact with the inner surfaces of the chamber 37 while permitting free flow of liquid past the edges of the plates. The float is provided with a vertical axial stem 41 having a contact head 42 at its upper end.

When the tank fills and the floats rise, the contact head 42 of each float presses upwardly a horizontal arm 43 of a bell crank transmission lever pivoted at 44 to a bracket 45 depending from a downwardly depressed area 46 of the plate 38. The bell crank lever is bifurcated and has a pair of spaced downwardly extending arms 47 connected by a cross bar 48 in a manner similar to that of Figs. 1, 2 and 3. The bar 48 bears against the lower part of a switch lever 49.

The switch lever 49 is mounted in a ball and socket bearing 50 of the same construction as in Fig. 4 and is sealed from the interior of the fuel tank and chamber 37 by a bellows 51 sealed to the switch lever and to a disc 52 secured to the plate 46 as in Figs. 1, 2 and 3. The upper part of the switch lever extends into a switch housing 53 mounted on the top wall 38 of the tank above the downwardly recessed part 46 and is provided with an adjusting screw 54 to contact and operate a microswitch 55 mounted on an insulating panel 56. Connectors connect the terminals of the switch with lead wires which pass out of the housing through an outlet fitting 57.

When the float 36 is in the lower part of the float chamber 37 and the head 42 below the arm 43, the bell crank lever rotates clockwise and free of the switch lever 49. When the float rises until the head 42 contacts the arm 43 and lifts it swinging the bell crank lever counterclockwise, the bar 48 then moves the switch lever counterclockwise about the bearing 50. This movement of the lever is very small being only sufficient to operate the microswitch and therefore does not appreciably deflect the bellows 51.

The microswitch may be a double throw switch to connect either of two branch circuits. An example is shown in Fig. 6. In this example a lead wire 58 is connected to a branch lead 59 and in another position with a branch lead 60. These branches may be used to control signals indicating when the tank is completely filled or not filled or to operate filling and emptying supply controls.

Through the above invention I have provided a float controlled switch in which the conditions that might under any circumstances lead to danger of fire or explosion have been eliminated. The bellows sealed to the float lever and to the bearing plate prevents the leakage of fuel into the switch chamber where it might form an explosive mixture of fuel and air that might be ignited by arcing or sparking of the switch contacts. The flexing of the bellows, which might eventually cause cracking or fracture of the bellows wall, is reduced to a minimum by limiting the switch lever movement to a small part of the float movement. Should, however, the bellows seal be impaired or fractured and fuel leakage occur, any explosion would be limited to the switch housing and could not pass through the ball and socket bearing. Due to the close fitting of the socket lining to the ball on each side of a median plane no looseness in this bearing can occur and therefore, even though fuel leakage might occur through the bearing if the bellows seal fails, any flame in the switch housing would be quenched and could not pass through the bearing.

Having described my invention, what I claim is:

1. A float switch which comprises a switch chamber, a bearing in a wall of said chamber, said bearing having a bearing surface of spherical curvature terminating in a pair of parallel planes symmetrical with the center of said sphere, an operating lever extending through said bearing and having a journal of spherical curvature mounted in said bearing and fitting said bearing with flame quenching clearance, a metallic bellows sealed to said wall about said bearing and to said operating lever, a switch mechanism in said switch chamber in position to be actuated by said operating lever upon tilting in said bearing and a float mechanism mounted to act on the rod outside said switch chamber to tilt said rod.

2. The float switch of claim 1 in which said float mechanism comprises a transmission lever pivoted to contact and tilt said operating lever and a float guided to contact said transmission lever and tilt it to said switch.

3. The float switch of claim 1 in which said float mechanism comprises a float movable vertically and engaging the transmission lever only in a part of the movement of said float.

4. The float switch of claim 1 in which said float mechanism comprises a transmission lever having an arm movable in one direction into engagement with said switch lever and movable in the opposite direction free of said switch lever, and a float movable vertically free of said transmission lever throughout a part of its movement and engaging said transmission lever to engage and move said switch lever only in a limited part of its movement.

5. The float switch of claim 4 in which said transmission lever is a bell crank lever having a horizontal arm to be engaged by the float and a vertical arm to engage the switch lever.

6. The float switch of claim 5 in which said vertical arm has an adjustable contact element between said arm and said switch.

7. The float switch of claim 4 in which said float has a vertical rod mounted thereon to contact and move said transmission lever.

References Cited in the file of this patent

UNITED STATES PATENTS

| | | |
|---|---|---|
| 980,214 | De Bisschop | Jan. 3, 1911 |
| 1,344,982 | Brown | June 29, 1920 |

(Other references on following page)

UNITED STATES PATENTS

| | | |
|---|---|---|
| 1,368,617 | Everett | Feb. 15, 1921 |
| 1,644,935 | McCabe | Oct. 11, 1927 |
| 1,821,699 | Fleck | Sept. 1, 1931 |
| 1,925,633 | Gulick | Sept. 5, 1933 |
| 1,935,029 | Henning | Nov. 14, 1933 |
| 1,995,895 | Parks | Mar. 26, 1935 |
| 2,043,530 | Dezotell | June 9, 1936 |
| 2,142,435 | Carlson | Jan. 3, 1939 |
| 2,144,587 | Kronmiller | Jan. 17, 1939 |
| 2,587,747 | McCullough | Mar. 4, 1952 |
| 2,692,923 | Ash | Oct. 26, 1954 |
| 2,730,591 | Nielsen | Jan. 10, 1956 |

FOREIGN PATENTS

| | | |
|---|---|---|
| 828,796 | France | Feb. 28, 1938 |